(12) United States Patent
Hu et al.

(10) Patent No.: US 11,175,578 B2
(45) Date of Patent: Nov. 16, 2021

(54) LIGHT SOURCE SYSTEM AND PROJECTION SYSTEM USING THE SAME

(71) Applicant: APPOTRONICS CORPORATION LIMITED, Guangdong (CN)

(72) Inventors: Fei Hu, Guangdong (CN); Haixiong Hou, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 229 days.

(21) Appl. No.: 16/608,405

(22) PCT Filed: Nov. 3, 2017

(86) PCT No.: PCT/CN2017/109341
§ 371 (c)(1),
(2) Date: Oct. 25, 2019

(87) PCT Pub. No.: WO2018/196318
PCT Pub. Date: Nov. 1, 2018

(65) Prior Publication Data
US 2021/0286252 A1  Sep. 16, 2021

(30) Foreign Application Priority Data
Apr. 27, 2017 (CN) .......................... 201710286466.6

(51) Int. Cl.
*G03B 21/20* (2006.01)
*H04N 9/31* (2006.01)
*G03B 33/08* (2006.01)

(52) U.S. Cl.
CPC .......... *G03B 33/08* (2013.01); *G03B 21/204* (2013.01); *G03B 21/208* (2013.01)

(58) Field of Classification Search
CPC .............. G03B 21/204; G03B 21/2013; G03B 21/2033; G03B 33/08; G03B 21/208; H04N 9/3161; H04N 9/3164; H04N 9/3152

See application file for complete search history.

(56) References Cited

U.S. PATENT DOCUMENTS

2014/0354892 A1   12/2014 Kitano
2016/0349606 A1*  12/2016 Nishimori .......... G03B 21/2086

FOREIGN PATENT DOCUMENTS

CN        102681318 A        9/2012
CN        104252093 A       12/2014
(Continued)

OTHER PUBLICATIONS

International Search Report of International Application No. PCT/CN2017/109341, dated Feb. 2, 2018.
(Continued)

*Primary Examiner* — Ryan D Howard
(74) *Attorney, Agent, or Firm* — Marshall, Gerstein & Borun LLP

(57) ABSTRACT

Provided is a light source system, including: a light emitting device configured to provide first and second light emitted in time sequence; and a light splitting system including: a light splitting device configured to split first light into first and second primary light and split second light into two paths of third primary light, in such a manner that first and second primary light exit respectively along first and second optical paths in a first time-sequence, first primary light exits along the second optical path and second primary light exits along the first optical path in a second time-sequence, and two paths of third primary light exit respectively along the first and second optical paths in a third time-sequence; and at least two light channels respectively disposed on the first (Continued)

and second optical paths. Each light channel is used for first to third primary light to exit in time sequence.

20 Claims, 10 Drawing Sheets

(56) References Cited

FOREIGN PATENT DOCUMENTS

| | | | |
|---|---|---|---|
| CN | 105511091 A | 4/2016 |
| CN | 106154713 A | 11/2016 |
| CN | 205910481 U | 1/2017 |
| CN | 205910482 U | 1/2017 |

OTHER PUBLICATIONS

Extended European Search Report for application No. 17907531.2, dated Apr. 28, 2020.
Office Action for application No. 201710286466.6, The State Intellectual Property Office of People's Republic of China, dated Apr. 23, 2020.

\* cited by examiner

LIGHT SOURCE SYSTEM AND PROJECTION SYSTEM USING THE SAME

CROSS-REFERENCE TO RELATED APPLICATION

This is the United States national phase of International Patent Application PCT/CN2017/109341, filed Nov. 3, 2017, which claims priority to CN 201710286466.6, filed Apr. 27, 2017. The entire contents of each of the foregoing applications are hereby incorporated herein by reference.

TECHNICAL FIELD

The present disclosure relates to the field of projection display, and more particularly, to a light source system and a projection system using the same.

BACKGROUND

A DLP (Digital Light Processing) projection display system has been widely used in projection display field, and includes a core component being a DMD (Digital Micromirror Device), which is a spatial light modulator. According to a number of DMDs, the DLP projection system can be classified into three types: a single-piece spatial light modulator projection system, a double-piece spatial light modulator projection system and a three-piece spatial light modulator projection system.

The single-spatial light modulator projection system generally uses an exciting light source to irradiate a rotating color wheel, to form three primary light, including red light, green light and blue light which are emitted in time sequence, and projects the red light, green light and blue light that are emitted in time sequence onto the DMD for modulation. The modulated monochromatic light images are quickly switched alternately on a screen, and the monochromatic light images of respective time sequences are mixed together by visual residual effect of a human eye to form a color image. The color wheel is coated with phosphors of red, green and blue colors to obtain three primary light, i.e., red light, green light and blue light. However, a light conversion efficiency of the red phosphor is relatively low, which is much lower than an efficiency of red light intercepting from yellow fluorescence.

At present, a method of obtaining the red light from the yellow fluorescence is generally applied to the two-piece spatial light modulator projection system and the three-piece spatial light modulator projection system. However, these projection systems are large in structure, complicated in production process, and high in price. When the method is applied to an existing single-piece spatial light modulator projection system, the yellow fluorescent is split into red light and green light. Since the green light is lost by color wheel reflection when the red light is incident to the DMD and the red light is lost by the color wheel reflection when the green light is incident to the DMD, utilization efficiency of light energy is relatively low.

SUMMARY

In view of the above circumstances, the present disclosure provides a light source system and a projection system having high utilization efficiency of light energy.

The present disclosure provides a light source system, including:

a light emitting device configured to provide first light and second light that are emitted in time sequence; a light splitting system, the light splitting system including: a light splitting device configured to split the first light into first primary light and second primary light and to split the second light into two paths of third primary light, in such a manner that the first primary light exits along a first optical path and the second primary light exits along a second optical path in a first time-sequence, the first primary light exits along the second optical path and the second primary light exits along the first optical path in a second time-sequence, and the two paths of third primary light exit respectively along the first optical path and the second optical path in a third time-sequence; and at least two light channels respectively disposed on the first optical path and the second optical path. Each of the at least two light channels is used for the first primary light, the second primary light, and the third primary light to exit in time sequence.

In one embodiment, the light emitting device includes: an exciting light source configured to generate exciting light; and a wavelength conversion device including a first wavelength region and a second wavelength region. The first wavelength region is configured to generate the first light under excitation of the exciting light, and the second wavelength region being configured to generate the second light under excitation of the exciting light or to transmit the exciting light to form the second light.

In one embodiment, the exciting light source is a blue laser, the first wavelength region is provided with a yellow fluorescent material, and the second wavelength region is a light transmission region.

In one embodiment, the light splitting device includes a color changing wheel and a driving device for driving the color changing wheel, the color changing wheel includes a first primary color region, a second primary color region, and a third primary color region that are distributed along a circumferential direction of the color changing wheel, the first primary color region is configured to split the first light into at least the first primary light exiting along the first optical path and the second primary light exiting along the second optical path, the second primary color region is configured to split the first light into at least the second primary light exiting along the first optical path and the first primary light exiting along the second optical path, and the third primary color region is configured to split the second light into the at least two paths of third primary light that are exit along the first optical path and the second optical path.

In one embodiment, the third primary color region is provided with a semi-reflective and semi-transmissive film or a polarizing sheet.

In one embodiment, the at least two light channels include: a first light homogenizing rod configured to homogenize the first primary light, the second primary light and the third primary light that exit from the light splitting device along the first optical path and to emit in time sequence; and a second light homogenizing rod configured to homogenize the first primary light, the second primary light and the third primary light that exit from the light splitting device along the second optical path and to exit in time sequence.

In one embodiment, the first light homogenizing rod includes a first end surface and a second end surface spaced apart along a direction of an optical axis of the first light homogenizing rod, and a plurality of connecting surfaces connected between the first end surface and the second end surface of the first light homogenizing rod and including a first surface, and wherein the second light homogenizing rod includes a first end surface and a second end surface spaced apart in a direction of an optical axis of the second light homogenizing rod, and a plurality of connecting surfaces connected between the first end surface and the second end surface of the second light homogenizing rod and including a first surface.

In one embodiment, the first end surface of the first light homogenizing rod and the first end surface of the second light homogenizing rod are both light incidence surfaces, the second end surface of the first light homogenizing rod and the second end surface of the second light homogenizing rod are both light emission surfaces, the first end surface and the second end surface of the first light homogenizing rod are both substantially perpendicular to the optical axis of the first light homogenizing rod, and the first end surface and the second end surface of the second light homogenizing rod are both substantially perpendicular to the optical axis of the second light homogenizing rod.

In one embodiment, the first end surface of one of the first light homogenizing rod and the second light homogenizing rod is inclined at a predetermined angle relative to the optical axis of the one of the first light homogenizing rod and the second light homogenizing rod and plated with an internal reflection film, a partial region of the first surface of one of the first light homogenizing rod and the second light homogenizing rod close to the first end surface thereof is a light incidence surface, the first primary light, the second primary light, and the third primary light that are incident from the light incidence surface are reflected by the first end surface and then exit from the second end surface along the first optical path or the second optical path.

In one embodiment, the first end surface and the second end surface of the other one of the first light homogenizing rod and the second light homogenizing rod are a light incidence surface and a light emission surface, respectively, and the light incidence surfaces of the first light homogenizing rod and the second light homogenizing rod are mirror-symmetrical with respect to the color changing wheel.

In one embodiment, both the first light homogenizing rod and the second light homogenizing rod are solid square rods, or one of the first light homogenizing rod and the second light homogenizing rod is a solid square rod and the other one is a hollow square rod.

In one embodiment, the first surface of the first light homogenizing rod abuts against the first surface of the second light homogenizing rod, and the first surface of the first light homogenizing rod and the first surface of the second light homogenizing rod are plated with an internal reflection film, or, the first surface of the solid square rod of the first light homogenizing rod and the second light homogenizing rod forms the first surface of the hollow square rod.

In one embodiment, the light splitting system includes at least one mirror configured to reflect the first primary light, the second primary light and the third primary light, which exit from the light splitting device, to enter the first light homogenizing rod and/or the second light homogenizing rod.

In one embodiment, the first light is yellow light and the second light is blue light, and the light splitting device splits, in time sequence, the yellow light into red light exiting along the first optical path and green light exiting along the second optical path, and red light exiting along the second optical path, and splits the blue light into two paths of blue light exiting along the first optical path and the second optical path.

The present disclosure provides a projection system, and the projection system includes: the light source system described above; and a spatial light modulator including at least two regions to respectively modulate the first primary light, the second primary light, and the third primary light that exit from each of the at least two light channels in time sequence.

In one embodiment, the at least two light channels of the light splitting system include three light channels, and the spatial light modulator is provided with three regions for respectively modulating the first primary light, the second primary light, and the third primary light that exit from each of the three light channels in time sequence.

The projection system provided by the embodiment of the present disclosure has following advantages: it is provided with at least two light channels, and a single spatial light modulator can modulate at least two incident light at the same time, such that the reflected light can be recovered to avoid the light loss occurring when the light splitting device splits the light, thereby improving a utilization efficiency of the light energy. Moreover, the projection system has a small structure and a low cost.

DESCRIPTION OF EMBODIMENTS

The technical solutions in the embodiments of the present disclosure are clearly and completely described in the following with reference to the accompanying drawings in the embodiments of the present disclosure. It is apparent that the described embodiments are only a part of the embodiments of the present disclosure but not all of the embodiments. All other embodiments obtained by those skilled in the art based on the embodiments of the present disclosure without creative efforts are within the scope of the present disclosure. All technical and scientific terms used herein have the same meaning as commonly understood by one of ordinary skill in the art to which the present disclosure belongs, unless otherwise defined. The term "or/and" as used herein includes any and all combinations of one or more of the associated listed items.

Embodiment 1

Figure 1:
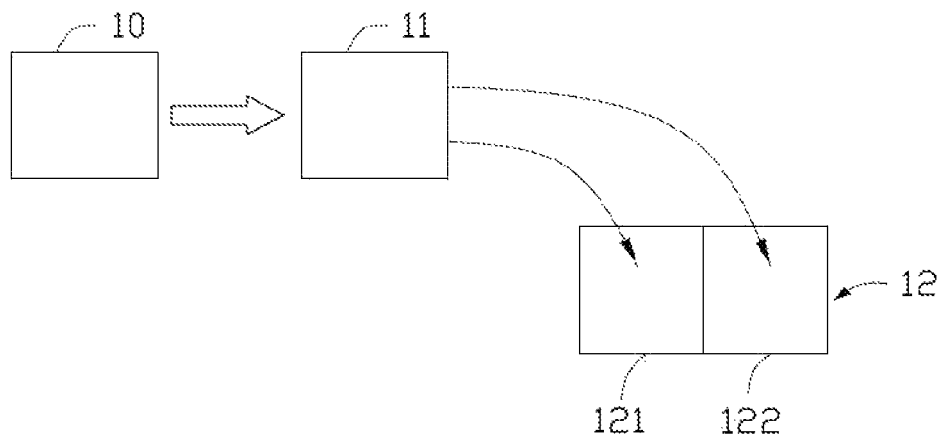
FIG. 1 is a block schematic diagram of a projection system according to Embodiment 1 of the present disclosure.

As shown in FIG. 1, FIG. 1 is a block schematic diagram of a projection system according to Embodiment 1 of the present disclosure. The projection system includes a light emitting device 10, a light splitting system 11, and a spatial light modulator 12. The light emitting device 10 and the light splitting system 11 together form a light source system. The light emitting device 10 is configured to provide first light and second light that are emitted in time sequence. The light splitting system 11 is configured to respectively split the first light and the second light into at least two paths of primary light and respectively guide the primary light to be incident to corresponding regions of the spatial light modulator 12. The spatial light modulator 12 is configured to modulate the primary light to obtain a desired color image.

Figure 2:
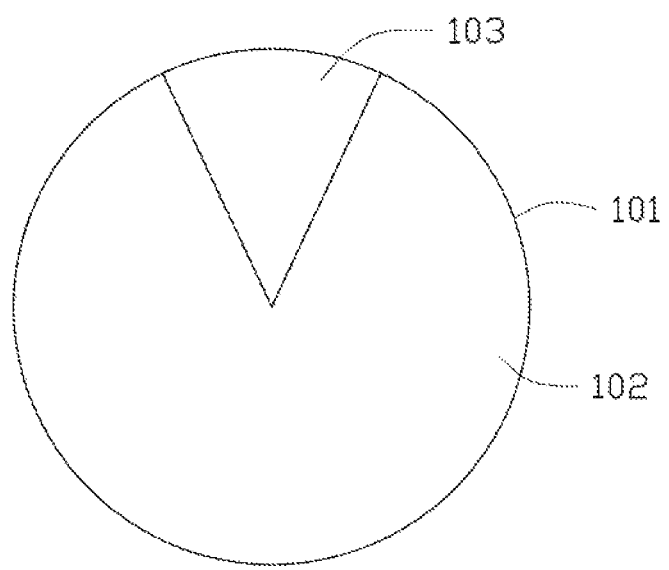
FIG. 2 is a structural schematic diagram of a wavelength conversion device according to Embodiment 1 of the present disclosure.

The light emitting device 10 includes an exciting light source and a wavelength conversion device. The exciting light source is configured to generate exciting light. The wavelength conversion device is configured to be excited by the exciting light or to transmit the exciting light to form the first light and the second light that are emitted in time sequence. Referring to FIG. 2 in conjunction, FIG. 2 is a structural schematic diagram of a wavelength conversion device of the light-emitting device 10. In this embodiment, the wavelength conversion device 101 is a fluorescent color wheel, has a disk shape, and includes a first wavelength region 102 and a second wavelength region 103 that are distributed in a circumferential direction of the fluorescent color wheel. The first wavelength region 102 is configured to generate the first light under excitation of the exciting light, and the second wavelength region 103 is configured to generate the second light under excitation of the exciting light or configured to transmit the exciting light to form the second light.

In this embodiment, the exciting light source is a blue laser. The first wavelength region 102 of the fluorescent color wheel is provided with a wavelength conversion material, such as yellow phosphors. The second wavelength region 103 is a light transmission region, and the light transmission region can transmit blue laser light. The fluorescent color wheel periodically rotates. When the exciting light is irradiated to the first wavelength region 102, the blue laser light is absorbed by the yellow phosphor and excites the yellow phosphor to generate yellow light, and the yellow light is the first light. When the exciting light is irradiated to the second wavelength region 103, the blue laser light is transmitted, and the blue light is the second light. Without doubt, the exciting light source is not limited to the blue laser but may be a laser of other color or other light sources such as an LED.

Figure 3:
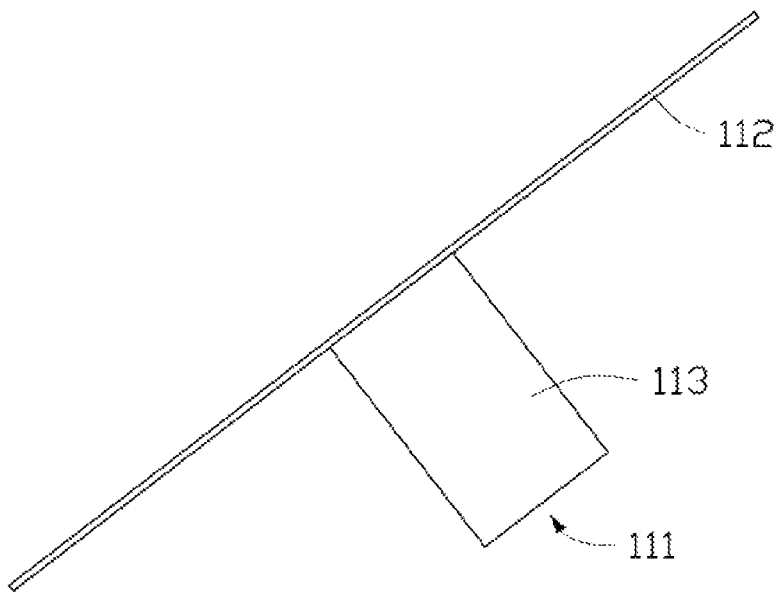
FIG. 3 is a structural schematic diagram of a light splitting device according to Embodiment 1 of the present disclosure.

Referring to FIG. 3 in conjunction, FIG. 3 is a structural schematic diagram of a light splitting device of the light splitting system 11. The light splitting system 11 includes a light splitting device 111 and at least two light channels (not shown in FIG. 3). The light splitting device 111 is configured to split the first light into first primary light and second primary light and configured to split the second light into at least two paths of third primary light. Each of the light channels is used in the first primary light, the second primary light and the third primary light exiting in time sequence. The light splitting device 111 includes a color changing wheel 112 and a driving device 113 for driving the color changing wheel 112. The color changing wheel 112 has a disk shape.

Figure 4:
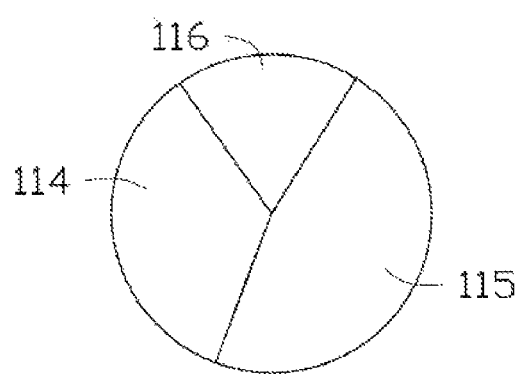
FIG. 4 is a structural schematic diagram of a color changing wheel according to Embodiment 1 of the present disclosure.

Specifically, referring to FIG. 4 in conjunction, FIG. 4 is a structural schematic diagram of the color changing wheel 112. The color changing wheel 112 includes a first primary color region 114, a second primary color region 115, and a third primary color region 116 distributed in the circumferential direction of the color changing wheel 112. The first primary color region 114 is configured to split the first light into first primary light exiting along a first optical path and second primary light exiting along a second optical path. In this embodiment, the first primary color region 114 transmits the first primary light and reflects the second primary light. The first primary light and the second primary light are finally incident to the spatial light modulator 12 along the first optical path and the second optical path, respectively. The second primary color region 115 is configured to split the first light into first primary light exiting along the second optical path and second primary light exiting along the first optical path. In this embodiment, the second primary color region transmits the second primary light and reflects the first primary light. The second primary light and the first primary light are finally incident to the spatial light modulator 12 along the first optical path and the second optical path, respectively. The third primary color region 116 is configured to split the second light into two paths of third primary light that respectively exit along the first optical path and the second optical path. In this embodiment, the third primary color region transmits and reflects the two paths of third primary light, and the two paths of third primary light are finally incident to the spatial light modulator 12 along the first optical path and the second optical path, respectively.

In the present embodiment, the color changing wheel 112 is synchronized with the fluorescent color wheel. The first wavelength region 102 of the fluorescent color wheel corresponds to the first primary color region 114 and the second primary color region 115 of the color changing wheel 112. The second wavelength region 103 of the fluorescent color wheel corresponds to the third primary color region 116 of the color changing wheel 112. That is, when the first wavelength region 102 of the fluorescent color wheel is excited to generate the yellow light, the yellow light is incident to the first primary color region 114 of the color changing wheel 112. The yellow light is split into red light and green light. The red light is transmitted through the first primary color region 114 and sent to a first region of the spatial light modulator 12 along a light channel disposed on the first optical path, and the red light is the first primary light. The green light is reflected by the first primary color region 114 and sent to a second region of the spatial light modulator 12 along a light channel disposed on the second optical path, and the green light is the second primary light. When the color changing wheel 112 is driven by the driving device 113 to rotate to the second primary color region 115, the green light is transmitted through the second primary color region 115 and sent to the first region of the spatial light modulator 12 along the light channel on the first optical path, and the red light is reflected by the second primary color region 115 and sent to the second region of the spatial light modulator 12 along the light channel on the second optical path. When the second wavelength region 103 of the fluorescent color wheel transmits the blue laser light, the color changing wheel 112 is driven by the driving device 113 to rotate to the third primary color region 116. The third primary color region 116 is provided with a color changing sheet, and the color changing sheet is a semi-reflective and semi-transmissive film or a polarizing sheet. Part of the blue light is transmitted by the third primary color region 116 and the other part is reflected by the third primary color region 116. The transmitted blue light is sent to the first region of the spatial light modulator 12 along the light channel on the first optical path. The reflected blue light is sent to the second region of the spatial light modulator 12 along the light channel on the second optical path. The blue light is the third primary light.

Thus, on one hand, since the yellow phosphor has a relatively high light conversion efficiency, the yellow phosphor is excited by the blue laser light to generate the yellow light, and then the yellow light is split into the red light and the green light, which constitute, together with the blue laser light (i.e., the blue light), the three primary light, i.e., the red light, the green light, and the blue light that are incident to the spatial light modulator 12 in time sequence, there is no need to obtain the red light from the red phosphor having a low light conversion efficiency, thereby improving the utilization efficiency of light energy. On the other hand, the light reflected by the color changing wheel 112 can be recovered and exit from the other light channel to the spatial light modulator 12, such that light loss in light splitting is avoided, thereby improving the utilization efficiency of light energy.

Without doubt, the first primary light, the second primary light, and the third primary light are not limited to the red light, the green light, and the blue light, respectively. This embodiment is merely illustrative, and the first primary light, the second primary light, and the third primary light may also be the green light, the red light and the blue light respectively, or other combination manners of the red light, the green light and the blue light. The first light and the second light are not limited to the yellow light and the blue light, respectively, as long as three primary light of red, green, and blue can be obtained by light splitting. Hereinafter, for convenience of description, the first light and the second light are exemplified by the yellow light and the blue light, and the first primary light, the second primary light, and the third primary light are respectively exemplified by the red light, the green light, and the blue light.

Figure 5:
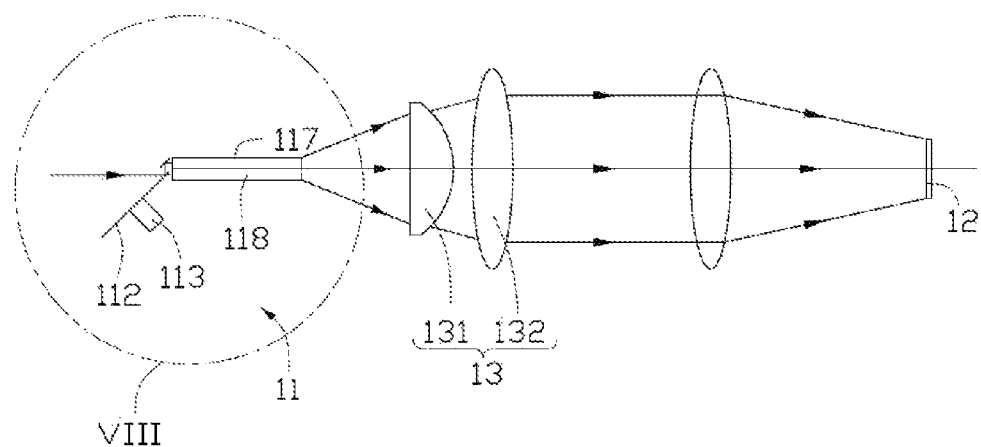
FIG. 5 is a schematic diagram of a specific structure of a projection system according to Embodiment 1 of the present disclosure.

Referring to FIG. 5 in combination, FIG. 5 is a schematic diagram of a specific structure of the projection system shown in FIG. 1. In this embodiment, the light splitting system 11 includes two light channels, and the two light channels are respectively located on the first optical path and the second optical path. Correspondingly, the spatial light modulator 12 includes two regions, a first region 121 and a second region 122. In an embodiment, the first region 121 is located on a left side and referred to as a left region. The second region is on a right side and referred to as a right region. In other embodiments, a positional relationship between the first region 121 and the second region 122 is not limited thereto and may be other positional relationships, for example, one is on an upper side and the other is on a lower side. The two light channels of the light splitting system 11 respectively include a first light homogenizing rod 117 and a second light homogenizing rod 118. The first light homogenizing rod 117 is disposed on the first optical path, and the second light homogenizing rod 118 is disposed on the second optical path. In this embodiment, the first light homogenizing rod 117 and the second light homogenizing rod 118 are both square rods. That is, cross sections of body portions thereof, perpendicular to their respective optical axes, are square. The cross sections of the body portions of the first light homogenizing rod 117 and the second light homogenizing rod 118, perpendicular to their respective optical axes, may also be in other quadrangles, such as prismatic shapes. The first light homogenizing rod 117 is configured to homogenize the first primary light, the second primary light, and the third primary light, which are reflected by the light splitting device 111, so that they are incident to the spatial light modulator 12 in time sequence. The second light homogenizing rod 118 is configured to homogenize the first primary light, the second primary light, and the third primary light, which are transmitted by the light splitting device 111, so that they are incident to the spatial light modulator 12 in time sequence.

In the present embodiment, the first light homogenizing rod 117 and the second light homogenizing rod 118 are substantially rectangular parallelepiped along directions of the respective optical axes. When the yellow light serving as the excited light passes through the first primary light region of the color changing wheel 112, the red light is transmitted, and the green light is reflected and recovered. In this case, the red light is homogenized by the second light homogenizing rod 118 and exits to enter the first region 121 of the spatial light modulator 12, and the green light is reflected to the first light homogenizing rod 117 and homogenized by the first light homogenizing rod 117 and then exits to enter the second region 122 of the spatial light modulator 12. When the yellow light serving as the excited light passes through the second primary light region of the color changing wheel 112, the green light is transmitted, and the red light is reflected and recovered. In this case, the green light is homogenized by the second light homogenizing rod 118 and exits to enter the left region 121 of the spatial light modulator 12, and the red light is reflected to the first light homogenizing rod 117 and homogenized by the first light homogenizing rod 117 and then exits to enter the second region 122 of the spatial light modulator 12. When the blue light passes through the third primary color region, part thereof is transmitted and the other part is reflected. In this case, the transmitted blue light is homogenized by the second light homogenizing rod 118 and exits to enter the first region 121 of the spatial light modulator 12, and the remaining blue light is reflected to the first light homogenizing rod 117 and homogenized by the first light homogenizing rod 117 and then exits to enter the second region 122 of the spatial light modulator 12.

Figure 6:
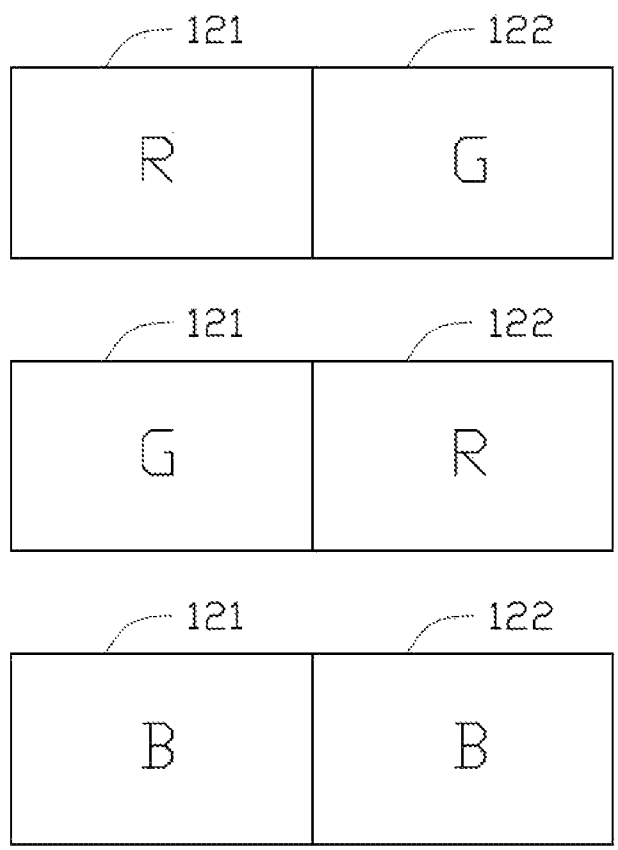
FIG. 6 is a time-sequence light emission diagram of a spatial light modulator according to Embodiment 1 of the present disclosure.

As shown in FIG. 6, FIG. 6 is a time-sequence light emission diagram of the spatial light modulator 12. When the light emitting device 10 emits the yellow light, the two regions of the spatial light modulator 12 simultaneously exhibit the red light and the green light. When the light emitting device 10 emits the blue light, the two regions of the spatial light modulator 12 simultaneously exhibit the blue light. The time-sequence light emission of the first region 121 of the spatial light modulator 12 is RGBRGB . . . , and the time-sequence light emission of the second region 122 of the spatial light modulator 12 is GRBGRB . . . where R represents the red light, G represents the green light, and B represents the blue light.

Figure 7:
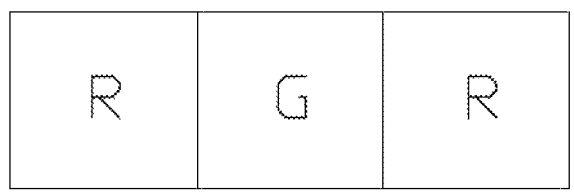
FIG. 7 is a time-sequence light emission diagram of a spatial light modulator according to another embodiment of the present disclosure.
Figure 7:
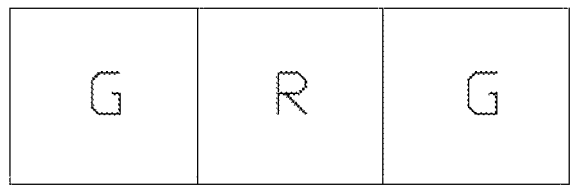
Figure 7:
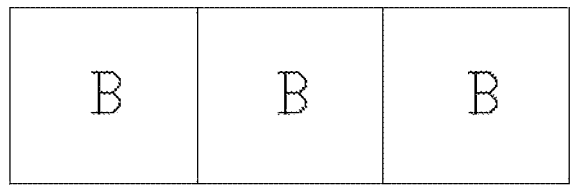

As shown in FIG. 7, FIG. 7 is a time-sequence light emission diagram of the spatial light modulator in another embodiment. In the embodiment, the light splitting system includes three light channels, that is, three light homogenizing rods are provided. Correspondingly, the spatial light modulator includes three regions for respectively receiving the three primary color time-sequence light exiting along the three light channels. The time-sequence light emissions of the three regions of the spatial light modulator are respectively RGBRGB . . . , GRBGRB . . . , RGBRGB, . . . . Specifically, the light splitting system includes a color changing wheel, a first light homogenizing rod, a second light homogenizing rod, and a third light homogenizing rod, a light splitting lens and a mirror. The color changing wheel includes a first primary color region, a second primary color region, and a third primary color region. The light splitting lens is coated with a semi-transmissive and semi-reflective film. The first wavelength region of the fluorescent color wheel corresponds to the first primary color region and the second primary color region of the color changing wheel. The second wavelength region of the fluorescent color wheel corresponds to the third primary color region of the color changing wheel. When the first wavelength region of the fluorescent color wheel is excited to generate the yellow light, the yellow light is incident to the first primary color region of the color changing wheel. The yellow light is split into the red light and the green light. The green light is transmitted to the second light homogenizing rod by the first primary color region, and the red light is reflected to the light splitting lens by the first primary color region. Half of the red light is reflected at the light splitting lens to the first light homogenizing rod, and the other half of the red light is transmitted through the light splitting lens and then reflected by the mirror to the third light homogenizing rod. When the yellow light is incident to the second primary color region, the yellow light is split into the red light and the green light. The red light is transmitted in the second primary color region to the second light homogenizing rod, and the green light is reflected in the first primary color region to the light splitting lens. Half of the green light is reflected at the light splitting lens to the first light homogenizing rod, and the other half of the green light is transmitted through the light splitting lens and then reflected by the mirror to the third light homogenizing rod. When the second wavelength region of the fluorescent color wheel transmits the blue laser light, the color changing wheel is driven by the driving device to rotate to the third primary color region. The third primary color region is provided with a semi-reflective and semi-transmissive film or a polarizing sheet. Part of the blue light is transmitted and the other part thereof is reflected in the third primary color region. The transmitted blue light is incident to the second light homogenizing rod, and the reflected blue light is reflected in the first primary color region to the light splitting lens. Half of the blue light is reflected at the light splitting lens to the first light homogenizing rod, and the other half of the blue light is transmitted through the light splitting lens and then reflected by the mirror to the third light homogenizing rod. The three regions of the spatial light modulator respectively receive the three primary color time-sequence light that exit from the first light homogenizing rod, the second light homogenizing rod and the third light homogenizing rod.

In other embodiments, the light splitting device may include a color changing wheel and a plurality of light splitting lenses and mirrors to split the primary light into multiple paths. Correspondingly, the spatial light modulator may include a plurality of regions to simultaneously modulate the primary light exiting along the plurality of the light channels, and each of the light channels is used in the first primary light, the second primary light, and the third primary light exiting in time sequence.

Figure 8:
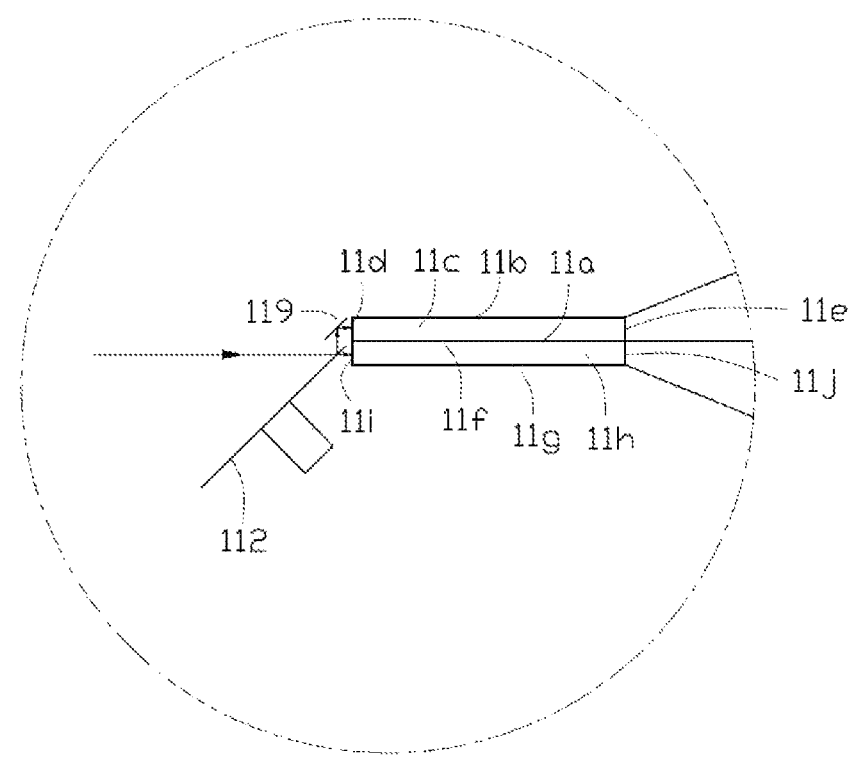
FIG. 8 is an enlarged schematic diagram of a portion VIII of FIG. 5.

Referring to FIG. 8, FIG. 8 is an enlarged schematic diagram of a portion VIII in FIG. 5. Specifically, the first light homogenizing rod 117 includes a plurality of connecting surfaces: a first surface 11*a*, a second surface 11*b*, a third surface 11*c*, and a fourth surface (not shown in FIG. 8). The first light homogenizing rod 117 further includes a first end surface 11*d* and a second end surface 11*e*. The first end surface 11*d* and the second end surface 11*e* are spaced apart along a direction of the optical axis of the first light homogenizing rod 117. The first surface 11*a*, the second surface 11*b*, the third surface 11*c* and the fourth surface are connected between the first end surface 11*d* and the second end surface 11*e*. The first surface 11*a* is opposite to the second surface 11*b*, and the third surface 11*c* is opposite to the fourth surface. The first surface 11*a* intersects the third surface 11*c* and the fourth surface, and the second surface 11*b* intersects the third surface 11*c* and the fourth surface.

The second light homogenizing rod 118 includes a plurality of connecting surfaces: a first surface 11*f*, a second surface 11*g*, a third surface 11*h*, and a fourth surface (not shown in FIG. 8). The second light homogenizing rod 118 further includes a first end surface 11*i* and a second end surface 11*j*. The first end surface 11*i* and the second end surface 11*j* are spaced apart along a direction of the optical axis of the second light homogenizing rod 118. The first surface 11*f*, the second surface 11*g*, the third surface 11*h* and the fourth surface are connected between the first end surface 11*i* and the second end surface 11*j*. The first surface 11*f* is opposite to the second surface 11*g*. The third surface 11*h* is opposite to the fourth surface. The first surface 11*f* intersects the third surface 11*h* and the fourth surface. The second surface 11*g* intersects the third surface 11*h* and the fourth surface.

In this embodiment, the first end surface 11*d* and the second end surface 11*e* of the first light homogenizing rod 117 are both substantially perpendicular to the optical axis of the first light homogenizing rod 117. The first end surface 11*i* and the second end surface 11*j* of the second light homogenizing rod 118 are both substantially perpendicular to the optical axis of the second light homogenizing rod 118. The first end surface 11*d* of the first light homogenizing rod 117 is aligned with the first end surface 11*i* of the second light homogenizing rod 118. The second end surface 11*e* of the first light homogenizing rod 117 is aligned with the second end surface 11*j* of the second light homogenizing rod 118. The first end surface 11*d* of the first light homogenizing rod 117 is a light incidence surface, and the second end 11*e* thereof is a light emission surface. The first end 11*i* of the second light homogenizing rod 118 is a light incidence surface, and the second end 11*j* thereof is a light emission surface. The color changing wheel 112 is inclined at a certain angle relative to the optical axes of the first light homogenizing rod 117 and the second light homogenizing rod 118. A first mirror 119 is disposed at the optical path between the color changing wheel 112 and the second light homogenizing rod 118. When the yellow light is incident to the first primary light region of the color changing wheel 112, the red light is transmitted to the second light homogenizing rod 118, and the green light is reflected by the first primary light region to the first mirror 119 and then reflected by the first mirror 119 to the first light homogenizing rod 117.

The first light homogenizing rod 117 and the second light homogenizing rod 118 are both solid square rods, and the first light homogenizing rod 117 and the second light homogenizing rod 118 are spliced into one piece. The first surface 11a of the first light homogenizing rod 117 abuts against the first surface 11f of the second light homogenizing rod 118. The first surface 11a of the first light homogenizing rod 117 and the first surface 11f of the second light homogenizing rod 118 are respectively plated with an internal reflection film. In this way, air between the first surface 11a of the first light homogenizing rod 117 and the first surface 11f of the second light homogenizing rod 118 is prevented from being squeezed out to destroy total reflection when the first light homogenizing rod 117 and the second light homogenizing rod 118 are spliced. Moreover, since two solid rods are spliced together, it is inevitable that a slicing gap will be generated. If processing precision of a slicing surface of the two solid rods is insufficient, the gap of the slicing surface will increase, which will affect an imaging effect. Therefore, the inner surface 11a of the first light homogenizing rod 117 and the first surface 11f of the second light homogenizing rod 118 are respectively plated with the internal reflection film, so that influence of the splicing gap can be reduced.

Referring back to FIG. 5, in some embodiments, an optical system 13 is disposed between the light splitting system 11 and the spatial light modulator 12. Specifically, the optical system 13 may be a combination of one plano-convex lens 131 and two biconvex lenses 132. The primary light exiting from the first light homogenizing rod 117 and the second light homogenizing rod 118 is output to the two regions of the spatial light modulator 12 via the optical system 13, respectively.

Embodiment 2

Figure 9:
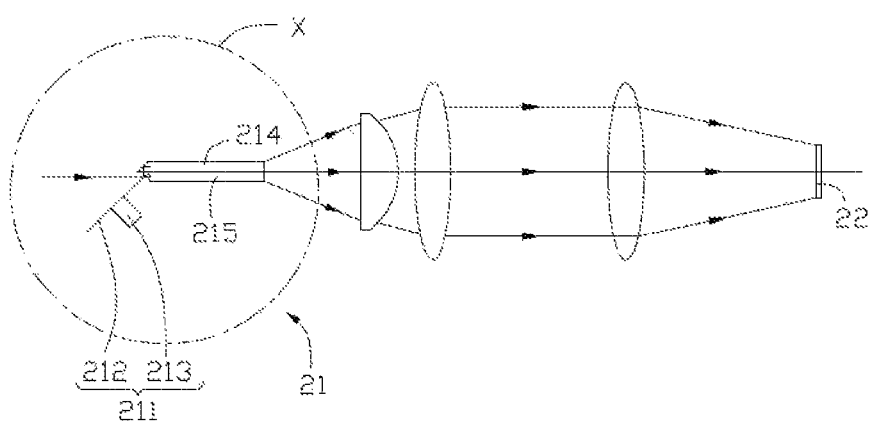
FIG. 9 is a structural schematic diagram of a projection system according to Embodiment 2 of the present disclosure.

As shown in FIG. 9, FIG. 9 is a structural schematic diagram of a projection system according to Embodiment 2 of the present disclosure. In the present embodiment, the projection system includes a light emitting device (not shown in FIG. 9), a light splitting system 21, and a spatial light modulator 22. The light emitting device is configured to provide first light and second light that are emitted in time sequence. The light splitting system 21 includes a light splitting device 211, a first light homogenizing rod 214 disposed on a first optical path, and a second light homogenizing rod 215 disposed on a second optical path. The light splitting device 211 includes a color changing wheel 212 and a driving device 213 for driving the color changing wheel 212. The light splitting device 211 is configured to split the first light into first primary light and second primary light. The light splitting device 211 is further configured to split the second light into at least two paths of third primary light. The first light homogenizing rod 214 and the second light homogenizing rod 215 respectively form two light channels. The spatial light modulator 22 includes two regions to respectively modulate the first primary light, the second primary light, and the third primary light that exit from the two light channels in time sequence.

Figure 10:
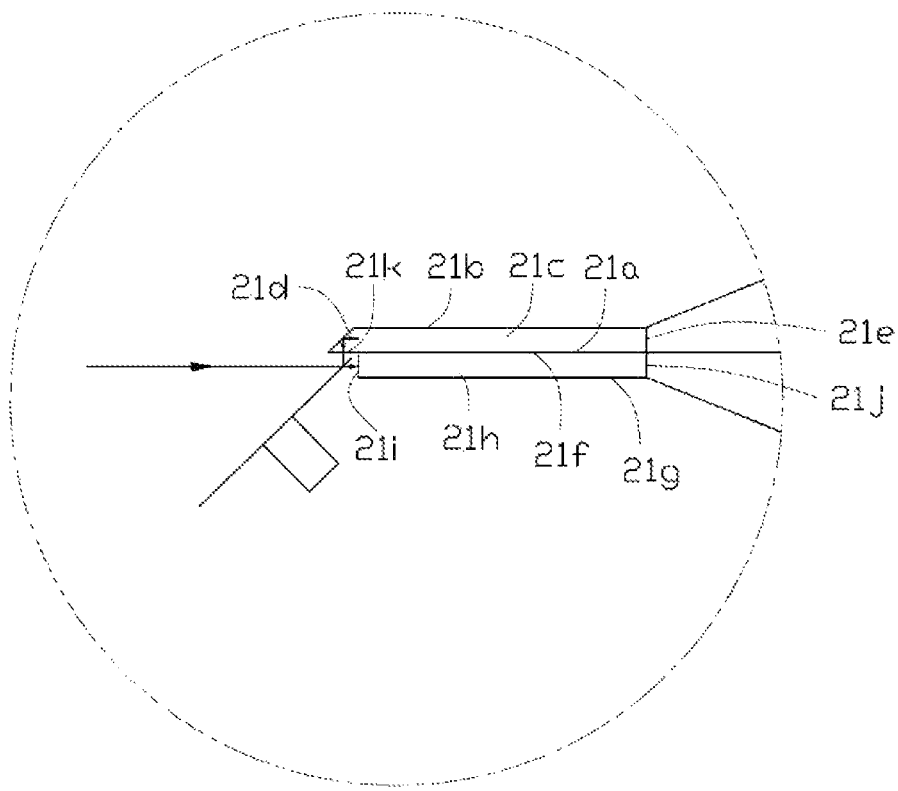
FIG. 10 is an enlarged schematic diagram of a portion X of FIG. 9.

Referring to FIG. 10 in conjunction, FIG. 10 is an enlarged schematic diagram of a portion X of the projection system of FIG. 9. In the present embodiment, the first light homogenizing rod 214 and the second light homogenizing rod 215 are both square rods, but a structure of the first light homogenizing rod 214 is different from that of the first light homogenizing rod in Embodiment 1. The first light homogenizing rod 214 includes a plurality of connecting surfaces: a first surface 21a, a second surface 21b, a third surface 21c, and a fourth surface (not shown in FIG. 10). The first light homogenizing rod 214 further includes a first end surface 21d and a second end surface 21e. The first end surface 21d and the second end surface 21e are spaced apart along a direction of an optical axis of the first light homogenizing rod 214. The first surface 21a, the second surface 21b, the third surface 21c and the fourth surface are connected between the first end surface 21d and the second end surface 21e. The first surface 21a is opposite to the second surface 21b, and the third surface 21c is opposite to the fourth surface. The first surface 21a intersects the third surface 21c and the fourth surface, and the second surface 21b also intersects the third surface 21c and the fourth surface.

The second light homogenizing rod 215 includes a plurality of connecting surfaces: a first surface 21f, a second surface 21g, a third surface 21h, and a fourth surface (not shown in FIG. 10). The second light homogenizing rod 215 further includes a first end surface 21i and a second end surface 21j. The first end surface 21i and the second end surface 21j are spaced apart along a direction of an optical axis of the second light homogenizing rod 215. The first surface 21f, the second surface 21g, the third surface 21h and the fourth surface are connected between the first end surface 21i and the second end surface 21j. The first surface 21f is opposite to the second surface 21g, and the third surface 21h is opposite to the fourth surface. The first surface 21f intersects the third surface 21h and the fourth surface, and the second surface 21g also intersects the third surface 21h and the fourth surface.

In this embodiment, the second end surface 21e of the first light homogenizing rod 214 is substantially perpendicular to the optical axis of the first light homogenizing rod 214. The first end surface 21i and the second end surface 21j of the second light homogenizing rod 215 are both substantially perpendicular to the optical axis of the second light homogenizing rod 215. The second end surface 21e of the first light homogenizing rod 214 is aligned with the second end surface 21j of the second light homogenizing rod 215. A length of the first surface 21a of the first light homogenizing rod 214 is longer than that of the second surface 21b and longer than that of the first surface 21f of the second light homogenizing rod 215, so that the first end surface 21d of the first light homogenizing rod 214 is inclined at a certain angle with respect to the optical axis of the first light homogenizing rod 214, and the first end surface 21d of the first light homogenizing rod 214 protrudes towards the light emitting device with respect to the first end surface 21i of the second light homogenizing rod 215. In this embodiment, a portion of the first surface 21a of the first light homogenizing rod 214 beyond the first surface 21f of the second light homogenizing rod 215 forms a first light incidence surface 21k, and the first end surface 21i of the second light homogenizing rod 215 is a second light incidence surface. The first light incidence surface 21k and the second light incidence surface are mirror-symmetrical with respect to the color changing wheel 212. Thus, for the same light source, an optical distance of the first light homogenizing rod 214 is consistent with an optical distance of the second light homogenizing rod 215, thereby improving efficiency.

The first end surface 21d of the first light homogenizing rod 214 is a sloped surface, and the first end surface 21d is plated with an internal reflection film. The primary light transmitted by the color changing wheel 212 enters from the second light incidence surface into the second light homogenizing rod 215 so as to be homogenized and it exits the second end surface 21*j* of the second light homogenizing rod 215 and enters the spatial light modulator 22. The primary light reflected by the color changing wheel 212 enters the first light homogenizing rod 214 from the first light incidence surface 21*k* and is reflected by the first end surface 21*d* of the first light homogenizing rod 214 and finally exits the second end surface 21*e* of the first light homogenizing rod 214 and reaches the spatial light modulator 22. Other structures of the projection system of this embodiment are not described in detail, and reference may be made to the projection system of Embodiment 1.

Embodiment 3

Figure 11:
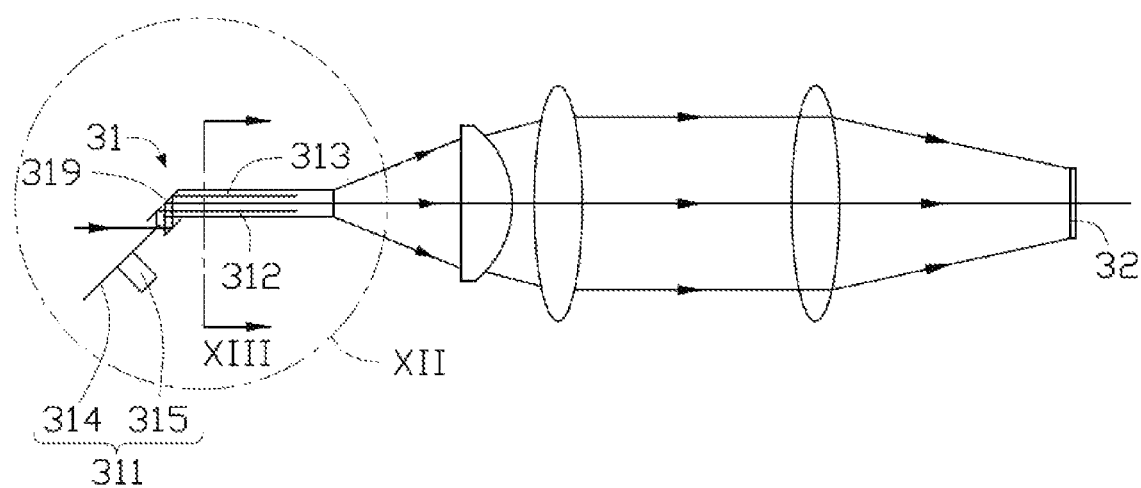
FIG. 11 is a structural schematic diagram of a projection system according to Embodiment 3 of the present disclosure.
Figure 12:
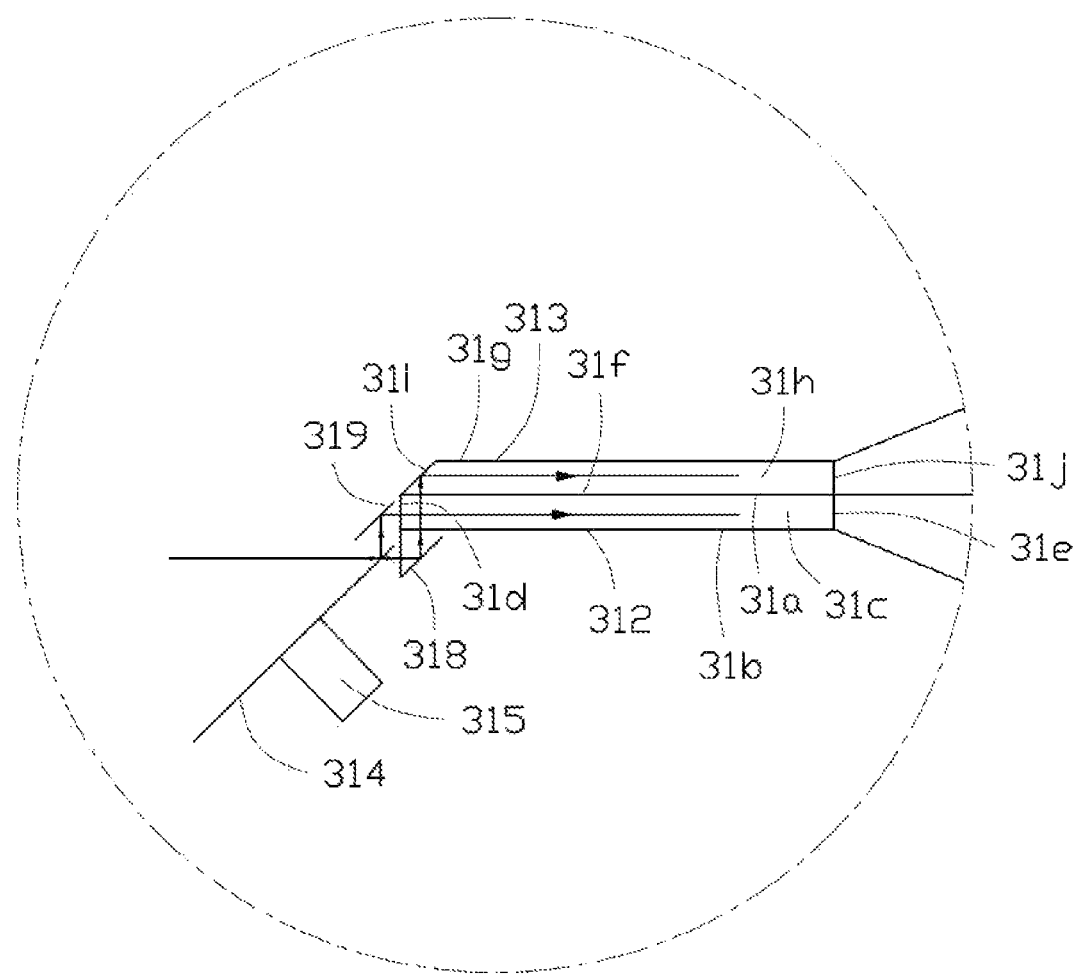
FIG. 12 is an enlarged schematic diagram of a portion XII of FIG. 11.

Referring to FIG. 11 and FIG. 12, FIG. 11 is a structural schematic diagram of a projection system according to Embodiment 3 of the present disclosure, and FIG. 12 is an enlarged schematic diagram of a portion XII of the projection system of FIG. 11. In the present embodiment, the projection system includes a light emitting device (not shown in FIG. 11), a light splitting system 31, and a spatial light modulator 32. The light emitting device is configured to provide first light and second light that are emitted in time sequence. The light splitting system 31 includes a light splitting device 311, a first light homogenizing rod 312 disposed on a first optical path and a second light homogenizing rod 313 disposed on a second optical path. The light splitting device 311 includes a color changing wheel 314 and a driving device 315 for driving the color changing wheel 314. The light splitting device 311 is configured to split the first light into first primary light and second primary light, and the light splitting device 311 is further configured to split the second light into at least two paths of third primary light. The first light homogenizing rod 312 and the second light homogenizing rod 313 respectively form two light channels. The spatial light modulator 32 includes two regions to respectively modulate the first primary light, the second primary light, and the third primary light that exit from the two light channels in time sequence.

In this embodiment, the first light homogenizing rod 312 and the second light homogenizing rod 313 are both square rods, and structures thereof are different from that of the first and second light homogenizing rods in Embodiment 1. In this embodiment, the first light homogenizing rod 312 is a hollow square rod, and the second light homogenizing rod 313 is a solid square rod. The primary light transmitted by the color changing wheel 314 is reflected by the first mirror 318 to the second light homogenizing rod 313. The primary light reflected by the color changing wheel 314 is reflected by the second mirror 319 to the first light homogenizing rod 312.

In this embodiment, the first light homogenizing rod 312 includes a plurality of connecting surfaces: a first surface 31*a*, a second surface 31*b*, a third surface 31*c*, and a fourth surface (not shown in FIG. 11 and FIG. 12). The first light homogenizing rod 312 further includes a first end surface 31*d* and a second end surface 31*e*. The first end surface 31*d* and the second end surface 31*e* are spaced apart along the direction of the optical axis of the first light homogenizing rod 312. The first surface 31*a*, the second surface 31*b*, the third surface 31*c* and the fourth surface are connected between the first end surface 31*d* and the second end surface 31*e*. The first surface 31*a* is opposite to the second surface 31*b*, and the third surface 31*c* is opposite to the fourth surface. The first surface 31*a* intersects the third surface 31*c* and the fourth surface, and the second surface 31*b* also intersects the third surface 31*c* and the fourth surface.

The second light homogenizing rod 313 includes a plurality of connecting surfaces: a first surface 31*f*, a second surface 31*g*, a third surface 31*h*, and a fourth surface (not shown in FIG. 11 and FIG. 12). The second light homogenizing rod 313 further includes a first end surface 31*i* and a second end surface 31*j*. The first end surface 31*i* and the second end surface 31*j* are spaced apart along the direction of the optical axis of the second light homogenizing rod 313. The first surface 31*f*, the second surface 31*g*, the third surface 31*h* and the fourth surface are connected between the first end surface 31*i* and the second end surface 31*j*. The first surface 31*f* is opposite to the second surface 31*g*, and the third surface 31*h* is opposite to the fourth surface. The first surface 31*f* intersects the third surface 31*h* and the fourth surface, and the second surface 31*g* also intersects the third surface 31*h* and the fourth surface.

In this embodiment, the second end surface 31*j* of the second light homogenizing rod 313 is substantially perpendicular to the optical axis of the second light homogenizing rod 313. The first end surface 31*d* and the second end surface 31*e* of the first light homogenizing rod 312 are both substantially perpendicular to the optical axis of the first light homogenizing rod 312. The second end surface 31*e* of the first light homogenizing rod 312 is aligned with the second end surface 31*j* of the second light homogenizing rod 313. The first surface 31*f* of the second light homogenizing rod 313 is equal in length to the first surface 31*a* of the first light homogenizing rod 312, but the second surface 31*g* of the second light homogenizing rod 313 is shorter than the first surface 31*f*, such that the first end surface 31*i* of the second light homogenizing rod 313 is inclined at a certain angle with respect to the optical axis of the second light homogenizing rod 313. In this embodiment, the first end surface 31*i* of the second light homogenizing rod 313 is plated with an internal reflection film. The primary light transmitted through the color changing wheel 314 is reflected by the first mirror 318, enters the second light homogenizing rod 313 via a portion of the first surface 31*f* of the second light homogenizing rod 313 close to the first end surface 31*i*, then it is reflected by the first end surface 31*i* of the second light homogenizing rod 313 and finally exits the second end surface 31*j* of the second light homogenizing rod 313 and reaches the spatial modulator 32.

Figure 13:
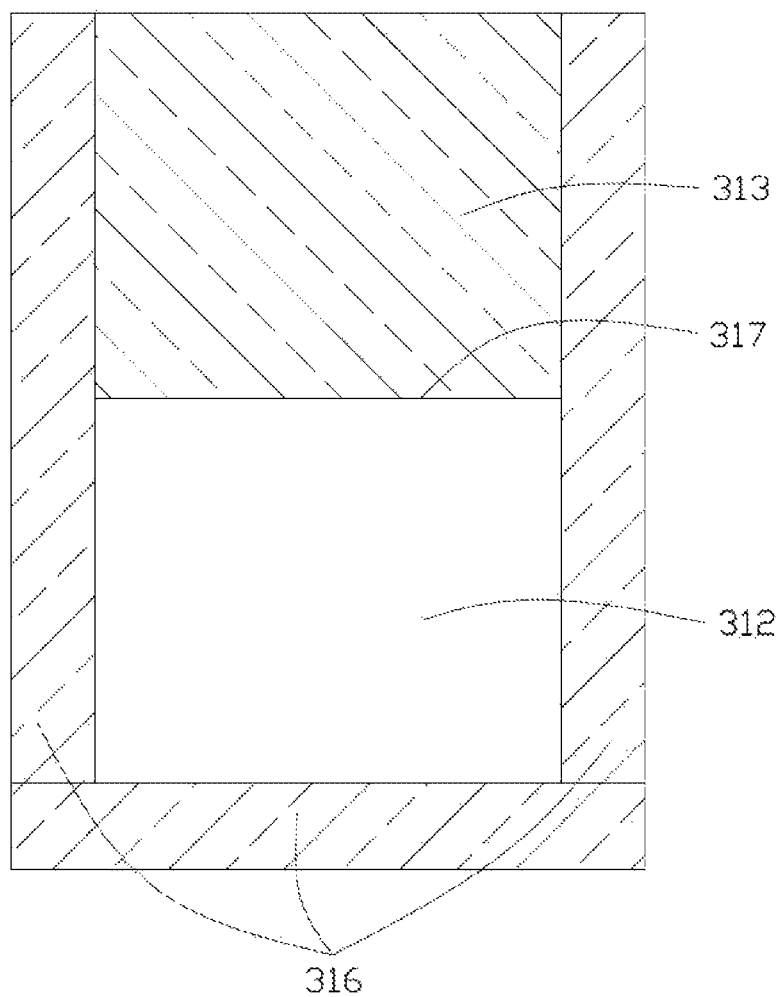
FIG. 13 is a combined cross-sectional schematic diagram of a first light homogenizing rod and a second light homogenizing rod of FIG. 11 taken along XIII-XIII of FIG. 11.

As shown in FIG. 13, FIG. 13 is a combined cross-sectional schematic diagram of the first light homogenizing rod 312 and the second light homogenizing rod 313 of FIG. 11 taken along XIII-XIII. Specifically, the first light homogenizing rod 312 is defined by three mirrors 316 and one reflective surface 317 of the second light homogenizing rod 313. The reflective surface 317 of the second light homogenizing rod 313 also constitutes the first surface 31*a* of the first light homogenizing rod 312 and the first surface 31*f* of the second light homogenizing rod 313. In this embodiment, the reflective surface 317 is not provided with a reflective layer at a position close to the first end surface 31*i*, to allow the primary light to be incident to the second light homogenizing rod 313 from this position. In other embodiments, depending on a situation, the reflective surface 317 may be completely provided with a reflective layer or a portion thereof is not provided with a reflective layer, to facilitate the incidence of the primary light. The two mirrors 316 disposed on two opposite sides of the first light homogenizing rod 312 extend to enclose two opposite sides of the second light homogenizing rod 313, and the light is reflected multiple times in the hollow square rod and then exits. The light is totally reflected inside the solid square rod to achieve light homogenization.

In this embodiment, the first light homogenizing rod 312 and the second light homogenizing rod 313 are formed by using a combination of a hollow rod and a solid square rod. Since only at an edge of a contact surface of the hollow square rod and the solid square rod is affected by a thickness, and most of the splicing surface is not affected by the surface of the hollow square rod, the influence of the splicing gap can be ignored. Moreover, the requirements on processing accuracy of the solid square rod can be relatively reduced. In other embodiments, undoubtedly, it is possible that the first light homogenizing rod 312 is a solid square rod and the second light homogenizing rod 313 is a hollow square rod. Other structures of the projection system of this embodiment are not described in detail, and reference may be made to the projection system of Embodiment 1.

Embodiment 4

Figure 14:
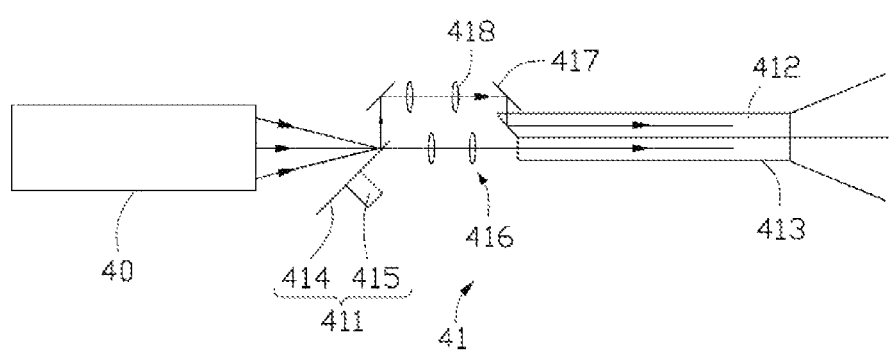
FIG. 14 is a structural schematic diagram of a projection system according to Embodiment 4 of the present disclosure.

As shown in FIG. 14, FIG. 14 is a structural schematic diagram of a projection system according to Embodiment 4 of the present disclosure. In the present embodiment, the projection system includes a light emitting device 40, a light splitting system 41, and a spatial light modulator (not shown in FIG. 14). The light emitting device 40 is configured to provide first light and second light that are emitted in time sequence. The light splitting system 41 includes a light splitting device 411, a first light homogenizing rod 412 disposed on a first optical path, and a second light homogenizing rod 413 disposed on a second optical path. The light splitting device 411 includes a color changing wheel 414 and a driving device 415 for driving the color changing wheel 414. The light splitting device 411 is configured to split the first light into first primary light and second primary light. The light splitting device 411 is further configured to split the second light into at least two paths of third primary light. The first light homogenizing rod 412 and the second light homogenizing rod 413 respectively form two light channels. The spatial light modulator includes two regions to respectively modulate the first primary light, the second primary light, and the third primary light that exit from the two light channels in time sequence. The projection system of the present embodiment differs from the projection system of Embodiment 3 in that a relay system 416 is disposed between the light splitting device 411 and the first light homogenizing rod 412 and the second light homogenizing rod 413.

Specifically, the relay system 416 includes two mirrors 417 and four convex lenses 418. The primary light transmitted by the color changing wheel 414 is incident to the second light homogenizing rod 413 via the two convex lenses 418, and the second light homogenizing rod 413 is a hollow square rod. The primary light reflected by the color changing wheel 414 is reflected by the mirror 417, passes through the other two convex lenses 418, and is reflected by the other mirror 417 to the first light homogenizing rod 412. The first light homogenizing rod 412 is a solid square rod.

As such, the relay system 416 is adopted to increase the optical distance of the projection system such that it is much easier to achieve splitting and combining of the light ray in a perspective of space. Other structures of the projection system of this embodiment will not be described in detail, and reference may be made to the projection system of Embodiment 1.

Embodiment 5

Figure 15:
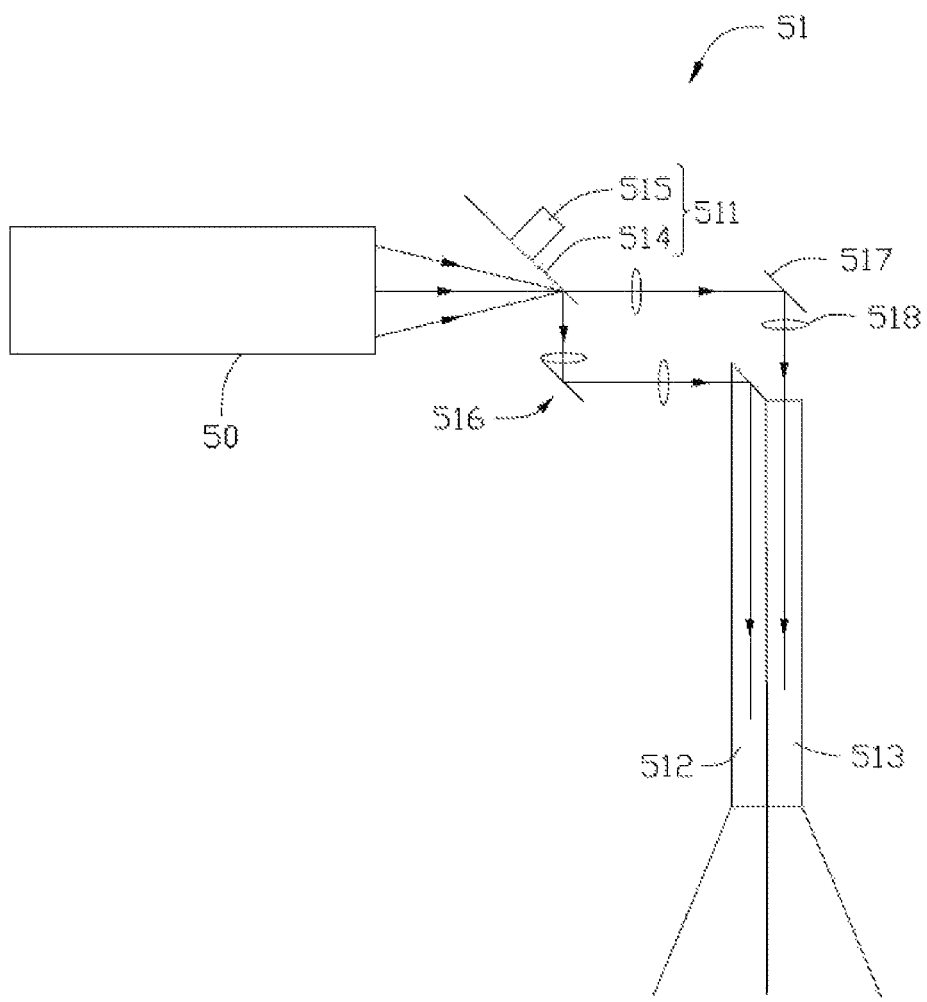
FIG. 15 is a structural schematic diagram of a projection system according to Embodiment 5 of the present disclosure.

As shown in FIG. 15, FIG. 15 is a structural schematic diagram of a projection system according to Embodiment 5 of the present disclosure. In the present embodiment, the projection system includes a light emitting device 50, a light splitting system 51, and a spatial light modulator (not shown in FIG. 15). The light emitting device 50 is configured to provide first light and second light that are emitted in time sequence. The light splitting system 51 includes a light splitting device 511, a first light homogenizing rod 512 disposed on the first optical path, and a second light homogenizing rod 513 disposed on the second optical path. The light splitting device 511 includes a color changing wheel 514 and a driving device 515 for driving the color changing wheel 514. The light splitting device 511 is configured to split the first light into first primary light and second primary light. The light splitting device 511 is further configured to split the second light into at least two paths of third primary light. The first light homogenizing rod 512 and the second light homogenizing rod 513 respectively form two light channels. The spatial light modulator includes two regions to respectively modulate the first primary light, the second primary light, and the third primary light that exit from the two light channels in time sequence. A relay system 516 is disposed between the light splitting device 511 and the first light homogenizing rod and the second light homogenizing rod. The projection system of the present embodiment differs from the projection system of Embodiment 4 in the difference of the relay system 516.

Specifically, the relay system 516 includes two mirrors 517 and four convex lenses 518. The primary light transmitted by the color changing wheel 514 first passes through one convex lens 518 and is then reflected by the mirror 517 and finally passes through one convex lens 518 so as to be incident to the second light homogenizing rod 513, and the second light homogenizing rod 513 is a hollow square rod. The primary light reflected by the color changing wheel 514 first passes through one convex lens 518 and is then reflected by another mirror 517 and finally passes through one convex lens 518 so as to be incident to the first light homogenizing rod 512, and the first light collecting rod 512 is a solid square rod.

As such, the relay system 516 is adopted to increase the optical distance of the projection system such that it is much easier to achieve splitting and combining of the light ray in a perspective of space. Without doubt, the relay system 516 is not limited to the above embodiments, and other methods may be adopted. Other structures of the projection system of this embodiment will not be described in detail, and reference may be made to the projection system of Embodiment 1.

In conclusion, the projection system of the present disclosure is provided with at least two light channels, and a single spatial light modulator can modulate at least two incident light beams at the same time. In this way, the reflected light can be recovered to avoid the light loss occurring when the light splitting device splits the light, thereby improving a utilization efficiency of the light energy. Moreover, the projection system uses only a single spatial light modulator, such that the structure is small in size and low in cost.

The above embodiments are merely configured to illustrate the technical solutions of the present disclosure and are not intended to be limiting, although the present disclosure has been described in detail with reference to the preferred embodiments. It should be understood by those skilled in the art that the modifications and equivalents of the present disclosure may be made without departing from the spirit and scope of the present disclosure.

What is claimed is:

1. A light source system, comprising:
   a light emitting device configured to provide first light and second light that are emitted in time sequence; and
   a light splitting system comprising:
   a light splitting device configured to split the first light into first primary light and second primary light and to split the second light into two paths of third primary light, in such a manner that the first primary light exits along a first optical path and the second primary light exits along a second optical path in a first time-sequence, the first primary light exits along the second optical path and the second primary light exits along the first optical path in a second time-sequence, and the two paths of third primary light exit respectively along the first optical path and the second optical path in a third time-sequence; and
   at least two light channels respectively disposed on the first optical path and the second optical path, wherein each of the at least two light channels is used for the first primary light, the second primary light, and the third primary light to exit in time sequence.

2. The light source system according to claim 1, wherein the light emitting device comprises:
   an exciting light source configured to generate exciting light; and
   a wavelength conversion device comprising a first wavelength region and a second wavelength region, wherein the first wavelength region is configured to generate the first light under excitation of the exciting light, and the second wavelength region being configured to generate the second light under excitation of the exciting light or to transmit the exciting light to form the second light.

3. The light source system according to claim 2, wherein the exciting light source is a blue laser, the first wavelength region is provided with a yellow fluorescent material, and the second wavelength region is a light transmission region.

4. The light source system according to claim 1, wherein the light splitting device comprises a color changing wheel and a driving device for driving the color changing wheel, wherein the color changing wheel comprises a first primary color region, a second primary color region, and a third primary color region that are distributed along a circumferential direction of the color changing wheel, the first primary color region is configured to split the first light into at least the first primary light exiting along the first optical path and the second primary light exiting along the second optical path, the second primary color region is configured to split the first light into at least the second primary light exiting along the first optical path and the first primary light exiting along the second optical path, and the third primary color region is configured to split the second light into the at least two paths of third primary light that are exit along the first optical path and the second optical path.

5. The light source system according to claim 4, wherein the third primary color region is provided with a semi-reflective and semi-transmissive film or a polarizing sheet.

6. The light source system according to claim 4, wherein the at least two light channels comprise:
   a first light homogenizing rod configured to homogenize the first primary light, the second primary light and the third primary light that exit from the light splitting device along the first optical path and to emit in time sequence; and
   a second light homogenizing rod configured to homogenize the first primary light, the second primary light and the third primary light that exit from the light splitting device along the second optical path and to emit in time sequence.

7. The light source system according to claim 6, wherein the first light homogenizing rod comprises a first end surface and a second end surface spaced apart along a direction of an optical axis of the first light homogenizing rod, and a plurality of connecting surfaces connected between the first end surface and the second end surface of the first light homogenizing rod and comprising a first surface, and wherein the second light homogenizing rod comprises a first end surface and a second end surface spaced apart in a direction of an optical axis of the second light homogenizing rod, and a plurality of connecting surfaces connected between the first end surface and the second end surface of the second light homogenizing rod and comprising a first surface.

8. The light source system according to claim 7, wherein the first end surface of the first light homogenizing rod and the first end surface of the second light homogenizing rod are both light incidence surfaces, the second end surface of the first light homogenizing rod and the second end surface of the second light homogenizing rod are both light emission surfaces, the first end surface and the second end surface of the first light homogenizing rod are both substantially perpendicular to the optical axis of the first light homogenizing rod, and the first end surface and the second end surface of the second light homogenizing rod are both substantially perpendicular to the optical axis of the second light homogenizing rod.

9. The light source system according to claim 7, wherein the first end surface of one of the first light homogenizing rod and the second light homogenizing rod is inclined at a predetermined angle relative to the optical axis of the one of the first light homogenizing rod and the second light homogenizing rod and plated with an internal reflection film, and wherein a partial region of the first surface of one of the first light homogenizing rod and the second light homogenizing rod close to the first end surface thereof is a light incidence surface, wherein the first primary light, the second primary light, and the third primary light that are incident from the light incidence surface are reflected by the first end surface and then exit from the second end surface along the first optical path or the second optical path.

10. The light source system according to claim 9, wherein the first end surface and the second end surface of the other one of the first light homogenizing rod and the second light homogenizing rod are a light incidence surface and a light emission surface, respectively, and the light incidence surfaces of the first light homogenizing rod and the second light homogenizing rod are mirror-symmetrical with respect to the color changing wheel.

11. The light source system according to claim 7, wherein both the first light homogenizing rod and the second light homogenizing rod are solid square rods.

12. The light source system according to claim 11, wherein the first surface of the first light homogenizing rod abuts against the first surface of the second light homogenizing rod, and the first surface of the first light homogenizing rod and the first surface of the second light homogenizing rod are plated with an internal reflection film.

13. The light source system according to claim 6, wherein the light splitting system comprises at least one mirror configured to reflect the first primary light, the second primary light and the third primary light, which exit from the light splitting device, to enter the first light homogenizing rod and/or the second light homogenizing rod.

14. The light source system according to claim 1, wherein the first light is yellow light and the second light is blue light, and the light splitting device splits, in time sequence, the yellow light into red light exiting along the first optical path and green light exiting along the second optical path, and green light exiting along the first optical path and red light exiting along the second optical path, and splits the blue light into two paths of blue light exiting along the first optical path and the second optical path.

15. The light source system according to claim 7, wherein one of the first light homogenizing rod and the second light homogenizing rod is a solid square rod and the other one is a hollow square rod.

16. A projection system, comprising:
a light source system comprising:
a light emitting device configured to provide first light and second light that are emitted in time sequence; and
a light splitting system comprising:
a light splitting device configured to split the first light into first primary light and second primary light and to split the second light into two paths of third primary light, in such a manner that the first primary light exits along a first optical path and the second primary light exits along a second optical path in a first time-sequence, the first primary light exits along the second optical path and the second primary light exits along the first optical path in a second time-sequence, and the two paths of third primary light exit respectively along the first optical path and the second optical path in a third time-sequence; and
at least two light channels respectively disposed on the first optical path and the second optical path, wherein each of the at least two light channels is used for the first primary light, the second primary light, and the third primary light to exit in time sequence; and
a spatial light modulator comprising at least two regions to respectively modulate the first primary light, the second primary light, and the third primary light that exit from each of the at least two light channels in time sequence.

17. The projection system according to claim 16, wherein the at least two light channels of the light splitting system comprise three light channels, and the spatial light modulator is provided with three regions for respectively modulating the first primary light, the second primary light, and the third primary light that exit from each of the three light channels in time sequence.

18. The projection system according to claim 16, wherein the light splitting device comprises a color changing wheel and a driving device for driving the color changing wheel, wherein the color changing wheel comprises a first primary color region, a second primary color region, and a third primary color region that are distributed along a circumferential direction of the color changing wheel, the first primary color region is configured to split the first light into at least the first primary light exiting along the first optical path and the second primary light exiting along the second optical path, the second primary color region is configured to split the first light into at least the second primary light exiting along the first optical path and the first primary light exiting along the second optical path, and the third primary color region is configured to split the second light into the at least two paths of third primary light that are exit along the first optical path and the second optical path.

19. The projection system according to claim 18, wherein the at least two light channels comprise:
a first light homogenizing rod configured to homogenize the first primary light, the second primary light and the third primary light that exit from the light splitting device along the first optical path and to emit in time sequence; and
a second light homogenizing rod configured to homogenize the first primary light, the second primary light and the third primary light that exit from the light splitting device along the second optical path and to emit in time sequence.

20. The light source system according to claim 15, wherein the first surface of the solid square rod of the first light homogenizing rod and the second light homogenizing rod forms the first surface of the hollow square rod.

* * * * *